H. U. DURANT.
VARIABLE SPEED TRANSMISSION.
APPLICATION FILED OCT. 2, 1918.

1,307,488.

Patented June 24, 1919.
3 SHEETS—SHEET 1.

Witnesses:

Inventor:
Herbert U. Durant,
By Frederick P. Ryon
Attorney

H. U. DURANT.
VARIABLE SPEED TRANSMISSION.
APPLICATION FILED OCT. 2, 1918.

1,307,488.

Patented June 24, 1919.
3 SHEETS—SHEET 2.

Witnesses:

Inventor:
Herbert U. Durant,
By
Attorneys

H. U. DURANT.
VARIABLE SPEED TRANSMISSION.
APPLICATION FILED OCT. 2, 1918.
1,307,488.
Patented June 24, 1919.
3 SHEETS—SHEET 3.
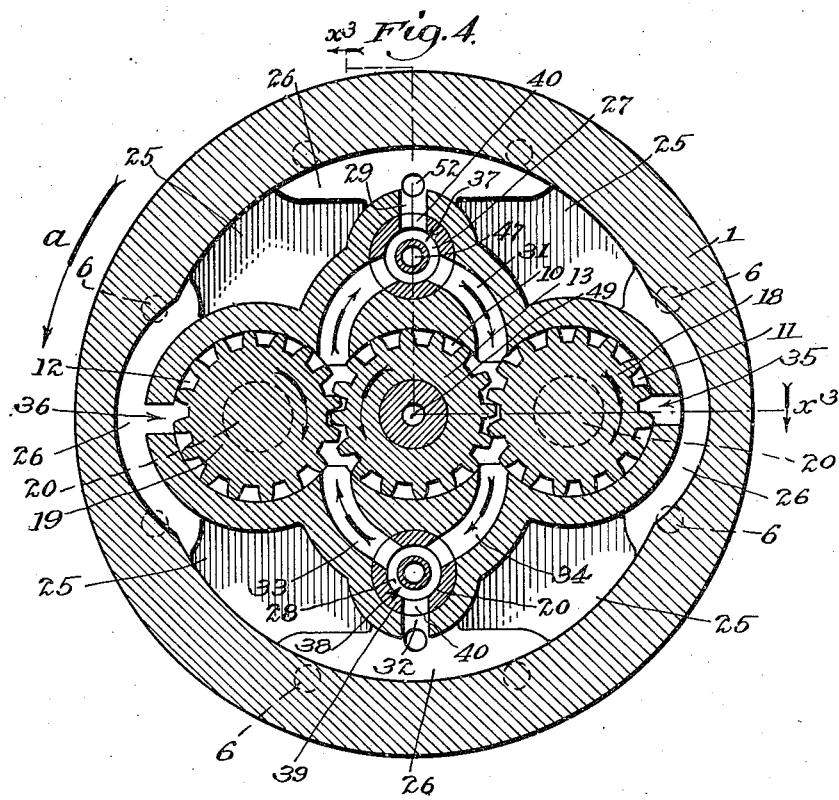
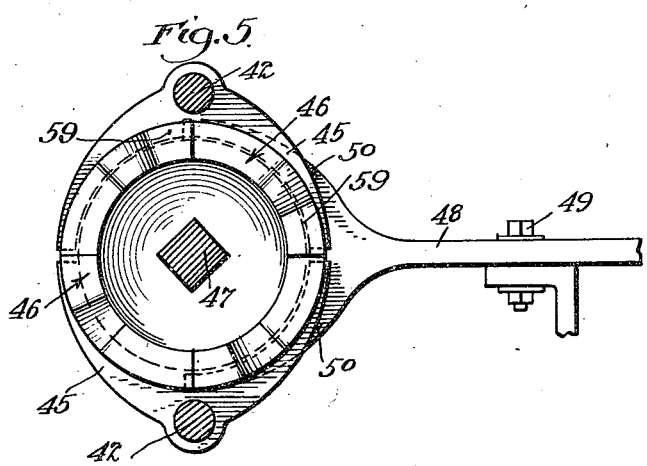
Witnesses:
Inventor:
Herbert U. Durant,
By Frederick W. Hyon
Attorneys

UNITED STATES PATENT OFFICE.

HERBERT U. DURANT, OF LOS ANGELES, CALIFORNIA, ASSIGNOR OF TWO-THIRDS TO MILO A. BAKER AND FRED L. BAKER, BOTH OF LOS ANGELES, CALIFORNIA.

VARIABLE-SPEED TRANSMISSION.

1,307,488.      Specification of Letters Patent.     Patented June 24, 1919.

Application filed October 2, 1918. Serial No. 256,587.

*To all whom it may concern:*

Be it known that I, HERBERT U. DURANT, a citizen of the United States, residing at Los Angeles, in the county of Los Angeles and State of California, have invented a new and useful Variable-Speed Transmission, of which the following is a specification.

This invention is a continuation in part of my application for patent filed March 5, 1918, Serial No. 220,437 and pertains to a device of the character designed to effect the driving of mechanism at different rates of speed by the employment of a fluid for preventing planetary rotation of the outer gears of a planetary gear system, and for that purpose the device is installed between the mechanism to be driven and the prime mover.

An object of the invention is to produce a device of this character of maximum simplicity combined with effectiveness of operation.

Another object is to make provision in a device of this character for constantly supplying the operating fluid to the gearing in such a way that the fluid body will be effective to produce pressure against the teeth of certain rotating gear wheels even though the fluid should not entirely fill the space designed to hold it.

Another object is to make provision for minimizing leakage of the operating fluid from the device under operating conditions.

Another object is to prevent any tendency to slippage on high speed or direct drive.

Another object is to make provision for throwing the clutch into commission subsequent to the complete throttling of the liquid.

Other objects and advantages will appear in the subjoined detailed description.

The accompanying drawings illustrate the invention:

Fig. 4 is a sectional elevation on line indicated by $x^4$—$x^4$, Fig. 3.

Fig. 5 is an elevation partly in section on line indicated by $x^5$—$x^5$, Fig. 3.

Figure 1:
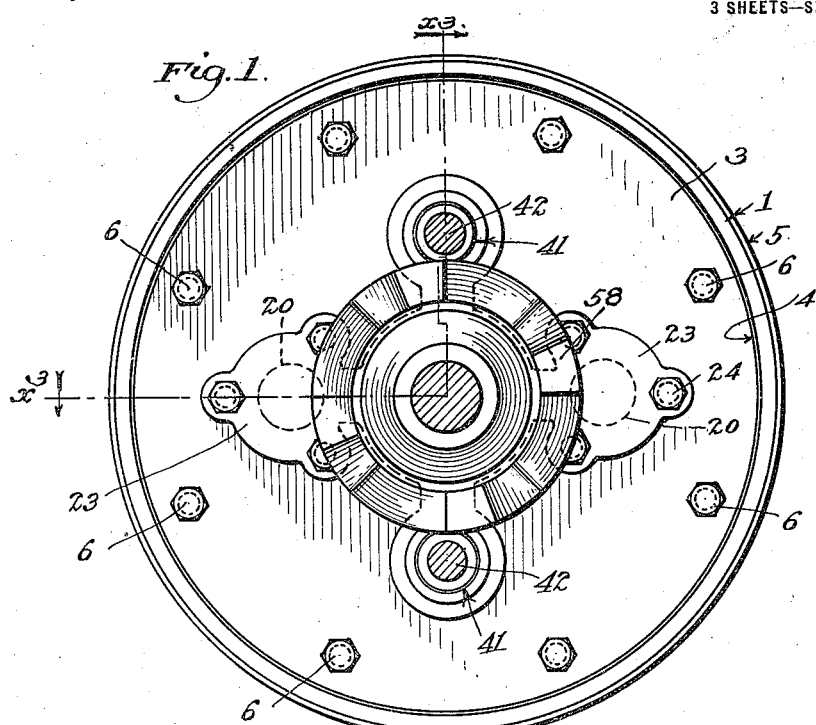
Figure 1 is an end view partly in section on line indicated by $x^1$—$x^1$, Fig. 3, of a variable speed mechanism embodying the invention.
Figure 2:
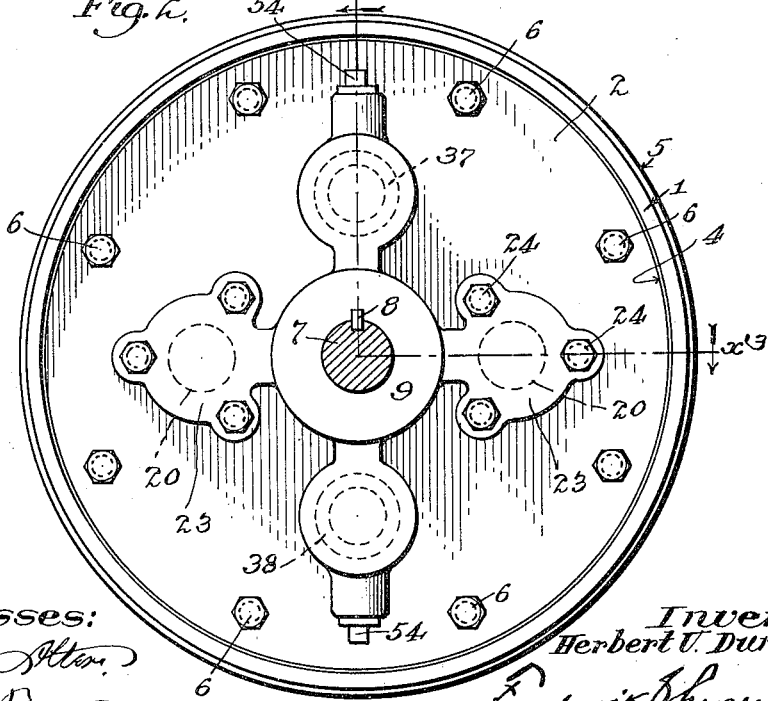
Fig. 2 is an elevation of the end opposite to that shown in Fig. 1.

There is provided a cylindrical housing comprising a cylindrical shell 1 and heads 2, 3 fitting in circular recesses 4 in the opposite ends of the shell. The shell 1 may be provided on its periphery with an ordinary pulley face 5 or with gear teeth, if desired. It is not necessary to illustrate the gear teeth since such construction is obvious and readily understood. It suffices to state regarding the pulley face 5 or gear teeth that either of them provides for the taking of power from the rotating shell 1 or applying of power from a prime mover to said shell. The heads 2, 3 are securely fastened in place by cap screws 6 or equivalents.

It may be desirable in some instances to take power from the shell 1 or deliver power to said shell by other means than the pulley face 5 and therefore the head 2 may be provided with a shaft 7 firmly fixed to the head 2 by a key 8 or equivalent. The head 2 is provided with a hub 9 and the key 8 fastens the shaft to said hub.

The shell 1 is provided internally with an axial circular chamber 10 and two circular chambers 11, 12 eccentric to the chamber 10 and joining therewith. Thus the chambers 10, 11 join one another adjacent the intermeshing teeth of the gear wheels 13, 18 and the chambers 10, 12 join one another adjacent the intermeshing teeth of the gear wheels 13, 19. The chambers 10, 11, 12 extend to and are closed at their ends by the heads 2, 3.

Accommodated in the chamber 10 is a gear wheel 13 fixed to a shaft 14 which projects outwardly through the hub or bearing 15 of the head 3. The shaft 14 is journaled in the hub 15 and said hub may be bushed as indicated at 16. In order to prevent leakage of liquid out of the bearing formed by the hub 15, a suitable stuffing box 17 is provided at the outer end of said bearing. This stuffing box need not be described in detail since any suitable well-known construction may be employed. It is evident that power may be applied to the shaft 14 to turn the gear wheel 13 or that power may be transmitted by the gear wheel to the shaft 14 and thence to any mechanism to which the shaft 14 may be connected.

Accommodated in the chambers 11, 12 are gear wheels 18, 19 respectively meshing with the gear wheel 13 and journaled in the housing heads 2, 3. The journaling is effected by stub shafts 20 of the gear wheels 18, 19 being journaled in bearings 21 located in the heads 2, 3. These bearings may be bushed, if desired, as indicated at 22. The bearings 21 are provided at their outer ends with caps 23 fastened to the heads 2, 3 by cap screws 24 or equivalents so as to close the outer ends of the bearings.

The gear wheels 13, 18, 19 substantially fit endwise and peripherally the respective chambers 10, 11, 12 and it is clear that if the shaft 14 be driven it will cause rotation of the gear wheels 18, 19. It is also clear that if the shell 1 be driven the gear wheels 18, 19 will be given planetary motion around the gear wheel 13. Thus when the shaft 14 is driven the housing and shaft 7 will remain stationary, and if the shell 1 be driven the gear wheel 13 and shaft 14 will remain stationary, said housing or shaft, as the case may be, being so held by reason of the load imposed upon it by the mechanism to be driven by it and connected thereto.

The shell 1 is provided near its periphery with symmetrically disposed reservoirs 25 which communicate with one another through passages 26, as clearly shown in Fig. 4. The passages communicate with the reservoirs at peripheral points of said reservoirs for a reason that will appear hereinafter. The reservoirs 25 are in pairs, one pair being on one side of the gear wheels 18, 19 and the other pair being on the opposite side of said gear wheels. Midway between the reservoirs 25 of each pair are valve chambers 27, 28. The valve chamber 27 may be connected by a duct 29 with the passage 26, though such connection is not absolutely essential and by a port or ports 30 with the junction point of the chambers 10, 12 adjacent the intermeshing teeth of the gear wheels 13, 19. The valve chamber 27 is connected by a port or ports 31 with the junction point of the chambers 10, 11 adjacent the intermeshing teeth of the gear wheels 13, 18. The valve chamber 28 may be connected by a duct 32 with the passage 26, though such connection is not absolutely essential, and by a port or ports 33 with the junction point of the chambers 10, 12 adjacent the intermeshing teeth of the gear wheels 13, 19. The valve chamber 28 is connected by a port or ports 34 with the junction point of the chambers 10, 11 adjacent the intermeshing teeth of the gear wheels 13, 18. The chamber 11 communicates with the associated passage 26 through a duct 35 and the chamber 12 communicates with its associated passage 26 through a duct 36.

The ducts 35, 36 are preferably positioned at the outermost portions of the chambers 11, 12 so that, if liquid be used as the operating medium and the reservoirs 25 are nearly empty, said liquid will readily pass through the ducts 35, 36 to the gear wheels 18, 19. The advantage of this will appear more fully hereinafter. In this connection it is noted that the inner sides of the passages 26 adjacent the ducts 35, 36 are not any closer to the axis of the housing than are the outer walls of the reservoirs 25 so that when the housing rotates even a relatively slight depth of liquid in the reservoirs will provide for working depth of the liquid in the passages 26 adjacent the ducts 35, 36.

Valves are provided to regulate the flow of liquid between the ports 30, 31 on one hand and between the ports 33, 34 on the other hand, and such valves may be of any suitable construction and the invention is not limited in all of its different phases to the particular valve shown in the drawings and now to be described. In the instance shown the valves are of the reciprocating or plunger type. The valve chamber 27 is provided with a cylindrical plunger valve 37 and the valve chamber 28 is provided with a cylindrical plunger valve 38. The valves 37, 38 slide in bushings 39 which form the walls of the valve chambers and the valve chamber ports and ducts extend through said bushings.

Figure 3:
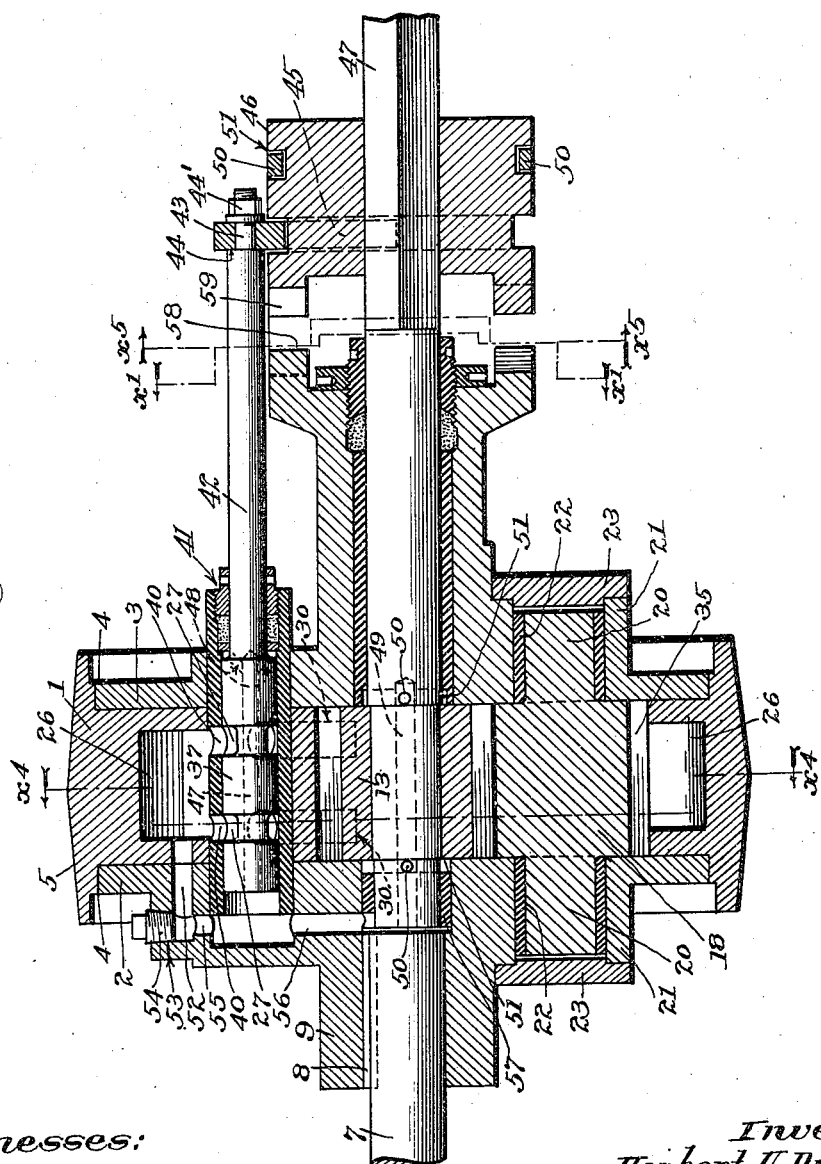
Fig. 3 is a sectional elevation on lines indicated by $x^3$—$x^3$, Figs. 1, 2 and 4.

The valves 37, 38 are each provided with an annular groove or grooves 40 adapted when the valve is in its extreme position to the right, as in Fig. 3, to register with the ports of the associated chamber. When the valves are moved to an intermediate position to the left the valves close the associated ports since the grooves 40 are then not registering with the ports. One end of each of the valve chambers 27, 28 is closed by the head 2 and said valve chambers project part way into said head. One end of each bushing 39 projects outward through the head 3 and is provided with a suitable stuffing box 41 which need not be described in detail since stuffing box construction is well understood. The stuffing boxes 41 surround the reduced outwardly projecting stems 42 of the valves and mounted on a reduced portion 43 of each of the valve stems and seated against a shoulder 44 and held by a nut 44' is a shifting fork 45 which engages an annular groove in a sleeve 46 shiftably mounted on a square portion 47 of the shaft 14. This sleeve 46 may be shifted by any suitable means, not shown, so as to reciprocate the valves 37, 38 to cause port-opening and port-closing movements of said valves. The sleeve-shifting means may comprise a lever 48 pivotally mounted at 49 and having a fork 50 engaging an annular groove 51 in the sleeve 46.

The device above described operates as follows: Assuming for purposes of description that the prime mover is connected to the shaft 14 and that the mechanism to be driven is connected either directly to the shell 1 or to the shaft 7, and assuming that the reservoirs 25 and various passages and ports have been filled with a suitable liquid as, for instance, oil, operation of the prime mover will cause rotation of the gear wheel 13. It may be assumed, for purposes of description, that the prime mover operates to rotate the gear wheel 13 counter-clockwise and that the valves 37, 38 are open. It is clear that the gear wheels 18, 19 will be rotated by the gear wheel 13 and that the oil will be carried by the gear wheels 13, 19 to the junction of the chambers 10, 12 and forced through the ports 30 to the valve 37, thence through the grooves 40 to the port 31, thence will be carried by the gear wheel 18 to the port 34. The oil circulates from the port 34 past the valve 38, thence into the port 33 or if the port 33 cannot accommodate the entire flow some of the oil may flow through the duct 32 into the associated passage 26 and thence to the reservoirs 25 at the end of said passage. From the port 33 and chamber 10 the oil passes into the chamber 12 and is carried by the teeth of the gear wheel 19 to the port 30 whereupon the circulation proceeds as before described.

Thus there is free circulation of the oil and the load, imposed on the shell 1 because of the mechanism with which the shaft 7 is connected, holds the shell stationary and consequently the gear wheels 18, 19 will rotate around fixed axes. Thus the transmission does not transmit any power to the mechanism with which the shell 1 is connected when the valves are in the open position. When it is desired to start operation of the mechanism with which the shaft is connected, the valves 37, 38 will be moved toward the left in Fig. 3 so as to partly close the ports which they control, thus impeding circulation of the oil. Since the oil cannot circulate so fast, assuming that the gear wheel 13 is being driven at the same rate of speed as formerly, the oil exerts pressure on the teeth of the gear wheels 18, 19 in a direction opposed to the direction of rotation of said gear wheels, and since there is opposition to the free rotation of the gear wheels 18, 19 it is evident that turning moment is exerted by the shafts 20 of the gear wheels 18, 19 upon the housing so as to rotate said housing in the direction of the arrow a, Fig. 4. Increased speed of the housing is effected by operating the valves 37, 38 to further close the ports which they control. When maximum speed, or direct drive, is desired, the valves 37, 38 will be operated to entirely close the ports and then the only circulation of oil that can take place is that due to leakage of the oil through the comparatively slight clearance spaces between the gear wheels and the walls of their chambers. This is so slight that in practice practically the full driving speed is transmitted from the prime mover to the mechanism being driven.

When the housing is rotating the centrifugal action exerted on the liquid in the reservoirs causes equalization of the volumes of liquid in the various reservoirs because of the provision of the passages 26 interconnecting the reservoirs. If these passages were absent and the reservoirs were not absolutely filled with liquid there might occur an unequal distribution of liquid in the space allotted to the liquid, thus producing an unbalanced unsymmetrical effect.

When the housing is rotating, even if the level of liquid in the reservoirs 25 should be comparatively low, it is clear that the gear wheels 18, 19 will have their teeth fully immersed in the liquid so that the pressure of the liquid against the teeth will be at a maximum, otherwise there would be a great loss of driving power when the level of liquid becomes low for any reason whatsoever. This is important when it is held in mind that more or less leakage of liquid from the device is liable to take place. Thus the advantage of the particular location of the passages 26 and ducts 35, 36 hereinbefore described becomes clear.

If the prime mover operate the shaft 14 in a reverse direction to that described above so as to turn the gear wheel 13 clockwise the circulation of the oil will be the reverse of that noted.

As an alternative operation it may be assumed, for example, that the housing is connected to the prime mover and the shaft 14 to the mechanism to be driven, and that the housing is driven by the prime mover in a direction opposite to that indicated by the arrow a Fig. 4. To prevent the transmission of power by the device, the valves 37, 38 will be opened. The rotating housing carries with it the gear wheels 18, 19 in planetary clockwise movement around the gear wheel 13 and circulation of the liquid is unimpeded and takes place as first described above and consequently the gear wheel 13 and its shaft 14 will be held stationary by the load. To start the load, the valves will be moved to restrict the circulation of liquid somewhat, consequently producing pressure of the liquid against the gear teeth of the gear wheels 18, 19 as above explained so as to tend to hold said gear wheels against rotation. Since, however, the same turning power is being applied to the housing as before it is evident that turning moment of the gear wheels 18, 19 about the gear wheel 13 will turn the gear wheel 13 clockwise so as to drive the shaft 14 clockwise. Higher speed is obtained by operating the valves to still further restrict the circulation of the oil, and to obtain maximum speed, as before, the valves are operated to entirely close the various ports.

If the prime mover be connected with the housing so as to turn the housing counter-clockwise in Fig. 4 then, when the valves are open, the circulation of the liquid will be the reverse of that first described above and, when the valves are closed, the gear wheel 13 will be turned counter-clockwise.

In order that the valves 37, 38 may be "balanced" so as to operate easily said valves are provided with axial ducts 47 communicating with the valve chambers at one end of the valves and with branch ducts 48 at the other end of the valves, said branch ducts communicating with the valve chambers.

To equalize the pressures against opposite ends of the gear wheel 13 to avoid excessive friction the shaft 14 is provided with an axial duct 49 communicating with transverse ducts 50 which open into annular spaces 51 adjacent the ends of the gear wheel 13.

A duct 52 leads from one of the passages 26 to an inlet opening 53 adapted to be closed by a plug 54. The operating liquid is furnished to the device through the inlet 53. A duct 55 also leads from the opening 53 to one of the valve chambers and a duct 56 leads from said valve chamber to a bushed bearing 57 which journals the inner end of the shaft 14.

This construction also minimizes leakage of liquid outward around the shaft 14 and through the stuffing box 17 because any liquid forced between the gear wheel 13 and the walls of the chamber 10 is returned through the annular spaces 51, and ducts 49, 50, 52, 55, 56 to the adjacent passage 26. The ducts 52, 55, 56, opening 53 and plug 54 may be provided in duplicate, if desired, one set diametrically opposite the other.

In the foregoing description two valves and valve chambers have been described as have also two gear wheels 18, 19 and chambers therefor, but it is understood that any desired number of said valves and gear wheels may be employed without departing from the spirit and scope of the invention. The paired construction of the gear wheels 18, 19 and valves is preferred but one or more than two may be provided, if desired.

The transmission described above is symmetrically constructed and is perfectly balanced when running because the liquid is uniformly distributed peripherally of the device by centrifugal action regardless of the pumping action of the gear wheels.

It is clear that because of the provisions of the passages 26 in the rotative shell communicating with the gear chambers 11, 12 at points adjacent the outermost portions of said gear chambers the liquid will be forced by centrifugal action to said gear chambers even when there is comparatively little liquid in the device.

It may be desirable in some instances to provide a clutch device between the shaft 14 and housing 1, 2, 3 so that any tendency to relative movement between the shaft and housing may be avoided in the event of leakage occurring as above noted. Therefore the hub 15 of the housing head 3 is provided at its outer end with clutch teeth 58 adapted to be engaged by clutch teeth 59 on the inner end of the sleeve 46 when said sleeve has been moved inwardly sufficiently far to cause the valves 37, 38 to be in port-closing position. The teeth do not engage before the ports are entirely closed and consequently when the teeth do engage there is very little relative movement of the shaft and housing. Thus shock will not occur.

It is now clear that when direct drive or high speed is desired the operator, having first moved the sleeve 46 inwardly sufficiently far to cause the valves to close the ports 30, 31, 33, 34, will move the sleeve 46 still farther inward to cause the teeth 59 to engage the teeth 58, thus locking the rotating sleeve 46 to the housing. To release the clutch the operator will move the sleeve outwardly.

I claim:

1. A variable speed transmission comprising a housing having a chamber axially thereof and another chamber eccentric of and joining the first named chamber, gear wheels in and substantially fitting the chambers and meshing with one another, there being a valve chamber in the housing and a port opening from the valve chamber to the junction point of the gear chambers, and a valve in the valve chamber, there being communication between the valve chamber and the axial gear chamber at a point removed from the first named port and there being a reservoir communicating with the eccentric gear chamber at the portion of said chamber farthest removed from the axis of the housing.

2. A variable speed transmission comprising a housing having a chamber axially thereof and other chambers eccentric of and joining the first named chamber, gear wheels in and substantially fitting the chambers respectively and meshing with one another, there being a valve chamber in the housing and ports opening from the valve chamber to the junction points of the gear chambers, and a valve in the valve chamber, there being intercommunicating reservoirs communicating with the respective eccentric gear chambers at the portions of said gear chambers farthest removed from the axis of the housing.

3. A variable speed transmission comprising a housing having a chamber axially thereof and other chambers eccentric of and joining the first named chamber, gear wheels in and substantially fitting the chambers respectively and meshing with one another, there being valve chambers on opposite sides of the axial gear chamber and ports opening from each of the valve chambers to the junction points respectively of the gear chambers, and valves in the valve chambers respectively, there being reservoirs near the periphery of the housing and passages connecting adjacent reservoirs with one another and one of said passages communicating with one of the eccentric gear chambers and another of said passages communicating with the other eccentric gear chamber, and the points of communication of the passages with the gear chambers being at the portions of said chambers farthest removed from the axis of the housing.

4. A variable speed transmission comprising a housing having a chamber axially thereof and other chambers eccentric of and joining the first named chamber, gear wheels in and substantially fitting the chambers respectively, there being valve chambers on opposite sides of the axial gear chamber and ports opening from the valve chambers to the junction points respectively of the gear chambers, and valves in the valve chambers respectively, there being in the housing reservoirs on opposite sides of the axial chamber and passages connecting the reservoirs to one another and ducts leading from said passages to the valve chambers respectively.

5. A variable speed transmission comprising a housing having a chamber axially thereof and other chambers eccentric of and joining the first named chamber, gear wheels in and substantially fitting the chambers respectively, there being valve chambers in the housing on opposite sides of the axial gear chamber and ports opening from the valve chambers to the junction points respectively of the gear chambers, and valves in the valve chambers respectively, there being in the housing reservoirs on opposite sides of the axial chamber and passages connecting the reservoirs to one another and ducts leading from said passages to the valve chambers and gear chambers respectively.

6. A variable speed transmission comprising a housing having a chamber axially thereof and another chamber eccentric of and joining the first named chamber, gear wheels in and substantially fitting the chambers and meshing with one another, there being in the housing a valve chamber and a port opening from the valve chamber to the junction point of the gear chambers, and a valve in the valve chamber controlling the port, there being communication between the valve chamber and the axial gear chamber at a point removed from the first named port, and there being in the housing a reservoir communicating with the eccentric gear chamber at the portion of said chamber farthest removed from the axis of the housing and there being a duct in the housing connecting the reservoir with the valve chamber and controlled by the valve.

7. A variable speed transmission comprising a housing having a space for fluid extending circumferentially thereof, there being a chamber axially of the housing and another chamber eccentric to the axial chamber and joining the axial chamber and communicating with the fluid-holding space at the portion of the eccentric chamber farthest removed from the axis of the housing, and there being in the housing a valve chamber and a port extending from the valve chamber to the junction point of the other chambers, intermeshing gear wheels fitting in said other chambers respectively, and a valve in the valve chamber to control the port, there being communication between the valve chamber and the eccentric chamber at a point removed from the port.

8. In a variable speed transmission, a housing having an axial chamber and having a chamber eccentric to the axial chamber, a shaft journaled in the housing and projecting into the axial chamber and provided with a duct adjacent the axial chamber, a gear wheel mounted on the shaft and fitting in the axial chamber, a gear wheel fitting in the eccentric chamber and meshing with the first named gear wheel, there being in the housing a reservoir communicating with the eccentric chamber and there being a space in the housing adjacent each side of the axial gear wheel communicating with the shaft duct, one of said spaces communicating with the reservoir and there being in the housing a valve chamber and a port opening from the valve chamber to the gear chambers adjacent the intermeshing teeth of the gear wheels, and a valve in the valve chamber controlling the port, the valve chamber communicating with the eccentric gear chamber at a point removed from the port.

9. A variable speed transmission comprising a housing having a chamber axially thereof and another chamber eccentric of and joining the first named chamber, gear wheels in and substantially fitting the chambers, there being in the housing a valve chamber and a port opening from the valve chamber to the junction point of the gear chambers, and a valve in the valve chamber, the valve chamber communicating with the axial gear chamber at a point removed from the first named port and there being in the housing a reservoir communicating with the eccentric valve chamber and there being spaces on both sides of the axial gear wheel in communication with the reservoir.

10. In a variable speed transmission, a shell having an axial chamber and having a chamber eccentric with the axial chamber, heads closing the opposite ends of the chambers and fastened to the shell, a shaft journaled in one of the heads and projecting into the axial chamber, a gear wheel on the shaft fitting the axial chamber, a gear wheel journaled in the heads and meshing with the first named gear wheel and fitting the eccentric chamber, there being a valve chamber in the shell, a plunger valve in the valve chamber having an annular groove and having a stem projecting through one of the heads, means to operate the valve stem, there being in the housing a port opening from the valve chamber and controlled by movement of the valve and communicating with the gear chambers adjacent the intermeshing teeth of the gear wheels, the valve chamber communicating with the eccentric gear chamber at a point removed from the port.

11. In a variable speed transmission, a housing having a plurality of symmetrically disposed reservoirs near its periphery and passages near the periphery connecting the reservoirs with one another, there being a gear chamber at the axis of the housing and other gear chambers eccentric to the axial chamber, a gear wheel fitting the axial gear chamber, other gear wheels fitting the eccentric gear chambers and meshing with the axial gear wheel, there being in the housing ducts opening from the outermost portions of the eccentric gear chambers to the adjacent passages respectively, there being in the housing valve chambers on opposite sides of the axial chamber midway between adjacent reservoirs and ports opening from the valve chambers to the points of junction of the axial gear chamber with the eccentric gear chambers, and valves in the valve chambers to control the ports.

12. In a variable speed transmission, a housing having a plurality of symmetrically disposed reservoirs near its periphery and passages near the periphery connecting the reservoirs with one another, there being a gear chamber at the axis of the housing and other gear chambers eccentric to the axial chamber, a gear wheel fitting the axial gear chamber, other gear wheels fitting the eccentric gear chambers and meshing with the axial gear wheel, there being in the housing ducts opening from the outermost portions of the eccentric gear chambers to the adjacent passages respectively and ducts opening from the valve chambers to the adjacent passages respectively, such valve chambers on opposite sides of the axial chamber midway between adjacent reservoirs, there being in the housing ports opening from the valve chambers to the points of junction of the axial gear chamber with the eccentric gear chambers, and valves in the valve chambers to control the ports.

13. A variable speed transmission comprising a housing having joining chambers, gear wheels in the chambers respectively meshing with one another and substantially fitting the chambers, there being in the housing a port opening from the chambers at the point of junction thereof, and a valve to control the flow of liquid through said port, there being in the housing a port to supply liquid to one of the gear chambers at the portion thereof farthest removed from the axis of the housing.

14. A variable speed transmission comprising a housing adapted to hold liquid, means tending to cause a circulation of the liquid in the housing, means to restrict the flow of said liquid, a shaft at the axis of the housing, clutch means to connect the shaft and housing, and means operatively connecting the flow-restricting means and clutch means for simultaneous operation.

15. A variable speed transmission comprising a housing having a chamber axially thereof and another chamber eccentric of and joining the first named chamber, gear wheels in and substantially fitting the chambers and meshing with one another, there being in the housing a valve chamber and a port opening from the valve chamber to the junction point of the gear chambers, a valve in the valve chamber, the valve chamber communicating with the axial gear chamber at a point removed from the first named port, clutch means on the housing, other clutch means adapted to engage the first named clutch means, and means to simultaneously operate the valve and the second named clutch means.

16. A variable speed transmission comprising a housing having a chamber axially thereof and another chamber eccentric of and joining the first named chamber, gear wheels in and substantially fitting the chambers and meshing with one another, there being in the housing a valve chamber and a port opening from the valve chamber to the junction point of the gear chambers, a slide valve in the valve chamber having a stem, the valve chamber communicating with the axial gear chamber at a point removed from the first named port, clutch means on the housing, and other clutch means adapted to engage the first named clutch means and connected with the valve stem.

Signed at Los Angeles, California, this 24th day of September, 1918.

HERBERT U. DURANT.

Witnesses:
  A. H. CLIMIE,
  H. S. HITCHCOCK.